United States Patent [19]

Hamaekers et al.

[11] 4,422,779

[45] Dec. 27, 1983

[54] HYDRAULIC BEARING SUPPORT

[75] Inventors: Arno Hamaekers, Hemsbach; Gerd-Heinz Ticks, Waldmichelbach; Hans-Joachim Rudolf, Rastede, all of Fed. Rep. of Germany

[73] Assignee: Firma Carl Freudenberg, Weinheim, Fed. Rep. of Germany

[21] Appl. No.: 257,170

[22] Filed: Apr. 24, 1981

[30] Foreign Application Priority Data

May 21, 1980 [DE] Fed. Rep. of Germany ....... 3019377

[51] Int. Cl.³ ............................................ F16C 27/00

[52] U.S. Cl. ................................ 384/99; 308/184 R; 384/215

[58] Field of Search ............ 308/26, 9, 184 R, 184 A, 308/28, 15; 384/99, 215, 220, 221, 223

[56] References Cited

U.S. PATENT DOCUMENTS

| | | | |
|---|---|---|---|
| 3,586,403 | 6/1971 | Cooley | 308/184 R |
| 4,319,768 | 3/1982 | Youngdale | 308/26 |
| 4,336,968 | 6/1982 | Hibner | 308/184 A |

FOREIGN PATENT DOCUMENTS

| | | |
|---|---|---|
| 811748 | 4/1959 | United Kingdom . |

*Primary Examiner*—Lenard A. Footland
*Attorney, Agent, or Firm*—Kenyon & Kenyon

[57] ABSTRACT

A two chambered support for a bearing, shaft or mounting which dampens vibration by hydraulic movement against a diaphragm and a flexible bellows is described.

10 Claims, 4 Drawing Figures

HYDRAULIC BEARING SUPPORT

BACKGROUND OF THE INVENTION

The invention relates to a bearing support mount which dampens vibration and isolates noise by means of hydraulic motion through fluid against a diaphragm and flexible bellows.

A hollow bearing support of a similar type is shown in British Pat. No. 811,748. There, a hole is centered in a diaphragm which divides the hollow cavity of the support into a working space and an equalizing space and the position of the diaphragm changes continuously and in an undefined manner as a function of the amplitude of the introduced vibrations. Vibrations with a large amplitude can be damped only inadequately. An improvement of the damping effect obtained is possible by damping the mobility of the diaphragm. Then, however, a degradation of the isolating properties against vibrations of low amplitude must be tolerated.

It is an object of the invention to develop an elastic mounting in which the damping and isolating effects obtained can be optimized independently of each other. The mounting thereby will exhibit good damping properties as well as good isolating effects. A good isolating effect is defined with respect to engine noise isolation as substantial elimination of solid-borne sound transmission from the engine to the chassis of the vehicle. A good dampening effect is defined with respect to engine shaft or support movement as substantial elimination of continued oscillation after the initial force creating movement is applied.

SUMMARY OF THE INVENTION

The hydraulic bearing support of the present invention solves these problems. It has an upper working chamber and a lower expansion chamber which are interconnected. It comprises a conical element of elastic material in an annular housing, a diaphragm centered between two stop plates mated to the inside circumference of the housing bottom and a flexible bellows which is mounted on the bottom of the housing. The bellows forms the expansion chamber and the element has a bearing base top and a concave bottom which forms the working chamber. A nozzle is rigidly associated with the inside edge of the housing bottom or with the stop plates and connects the working and expansion chambers. The ratio of the length to the diameter of the nozzle is in the range of from 4:1 to 80:1 and the ratio of the volume of the working chamber to the volume of the nozzle is in the range of from 4:1 to 200:1.

BRIEF DESCRIPTION OF THE DRAWINGS

In the drawings an embodiment example of the bearing support according to the invention is depicted.

DETAILED DESCRIPTION OF THE INVENTION

Figure 1:
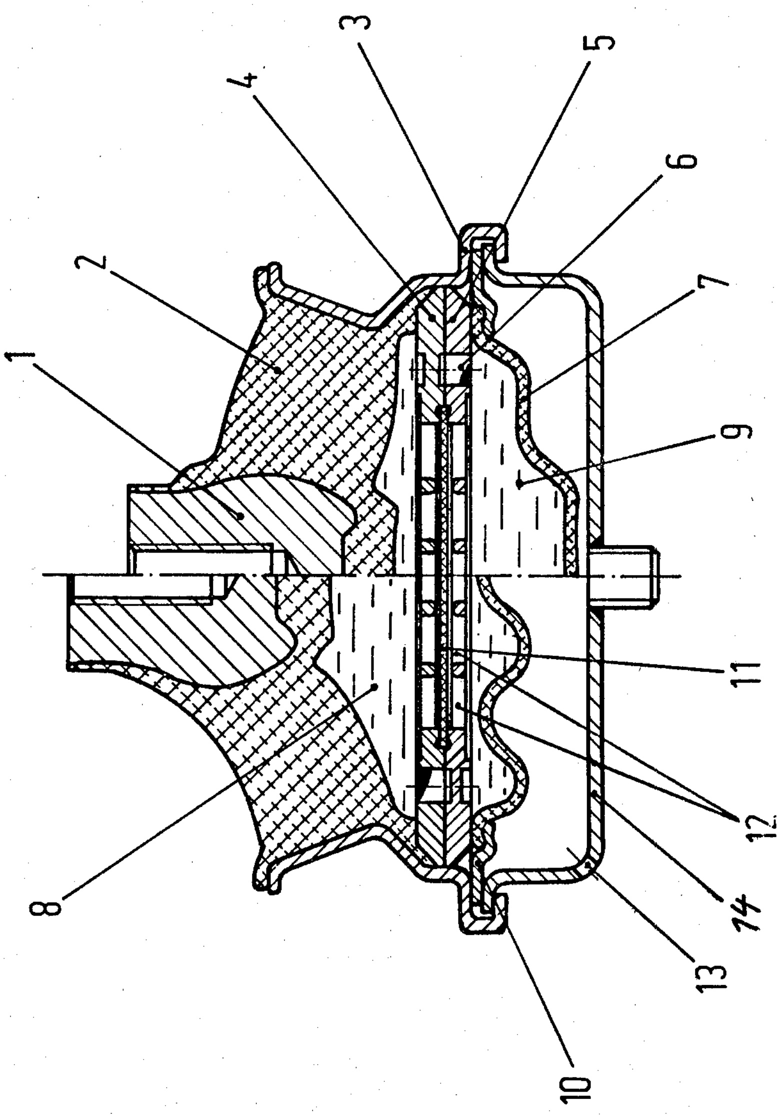
FIG. 1 shows the bearing support in a longitudinal section. The left-hand part of the figure refers to the load situation in which the elastic element (2) is sprung out; the right-hand part of the drawing makes reference to a load situation in which the elastic element (2) is sprung in under the action of the load.

The advantageous properties of the bearing support of the invention will be seen from the following manner of operation.

The support is a hydraulic double-chamber elastic support. The internal hydraulic pressure in the working chamber is independent of the static load and the pressure changes therein, which result from the vibrations introduced, are of a purely dynamic nature. They have no effect on the resilient characteristics of the conical element of rubber-elastic material which defines the working chamber. Its cross section can consequently be made as desired and thus also in such a way that optimum isolation of introduced vibrations of small amplitude is ensured. Vibrations of this kind are described by the relation that the respective volume of liquid displaced by the conical element absorbing the vibration must be smaller than the volume than can be taken up by a synchronous diaphragm movement. A displacement of liquid components through the nozzle into the equalization space does not take place when such small amplitude vibrations are introduced.

When vibrations of larger amplitude are introduced, the expansion of the diaphragm is impeded by the stop plates arranged on both sides thereof. A dynamic pressure build-up occurs in the working space and results in a synchronous flow of the liquid volume through the nozzle. If customary hydraulic oils are used, an optimum damping effect for the introduced vibrations is obtained if the range of ratios of the length to the diameter of the nozzle is from 4:1 to 80:1 and if the range of ratios of the volume of the working chamber to the volume of the nozzle is from 4:1 to 200:1, a range of 8:1 to 60:1 being preferred and a range of 10:1 to 30:1 being especially preferred. Besides the choke effect caused by the narrow cross section of the nozzle, the excellent damping effect with respect to the introduction of vibrations of large amplitude is also due to dynamic effects. These include especially the cancellation of the vibrations introduced because of the back-and-forth movement of the mass of the liquid volume contained in the nozzle. The equalization chamber is formed by a flexible bellows with particularly soft elastic properties which prevent the build-up of pressure in the interior. If the equalization chamber is confined by accordion bellows of a plastomer or an elastomer material, for instance, of PVC or rubber, a particularly soft material must be chosen. If rolled diaphragms are used, good results can be obtained if they consist of a flexible woven material which is sealed on one or both sides by a coating of an elastomer or plastomer material. The wall thickness of such a diaphragm may be reduced to a few tenths of a millimeter. In order to prevent mechanical damage, the bellows can be arranged in a protective cage or cup of a metallic material which is firmly connected to the housing. By suitably arranged venting holes, free mobility of the bellows is ensured.

In one embodiment the diaphragm can take the form of a disk and the stop plates are annular sealing rings joining the bottom of the housing. The disk is between the rings and will seal against them but is freely movable within the limits of the distance between the two rings. It is, in general, conceivable to make the disk in the form of a floating piston where the mobility can be impeded by the friction forces that must be overcome. The bearing play of such a floating piston, which may, for instance, have the form of a flat plate of rubber or plastic, may therefore be designed so that on the one hand the mobility is not impeded and that on the other hand, sufficient sealing against the stop plates is ensured. In the sense of the present invention it is undesirable if an appreciable hydraulic connection comes about between the working chamber and the equalization chamber.

It is also possible to join the floating piston to the rings in a liquid-tight manner but allow for movement by making the junction with a flexible transition piece. A certain amount of impairment of the free mobility of the piston cannot be avoided in this situation, which in difficult cases may have an adverse effect on the decoupling of high frequency vibrations and therefore, the insulating properties of the bearing support.

In general a round shape of the diaphragm and stop plates is preferred. However, it is also possible, depending on the shape of the bearing support to choose optionally different forms, for instance, an oval shape. In all cases it is desired that the movable diaphragm or disk cover at least 50% of the inside area of the working chamber. Thereby, cross flow and other undesirable effects in the introduction of small vibrations can largely be suppressed.

The diaphragm can be made flexible. It may consist, for instance, of a rubber-elastic material. In this situation, depending on the flexibility, the stop plates are grids which are connected to a support flange and have regularly recurring cutouts, the open-area of which is 40 to 90%. The plates clamp the diaphragm between them and the recess for receiving the diaphragm can be larger in cross section than the diaphragm to make possible particularly easy mobility. The respective distance from the stops arranged on both sides is mirror-symmetrically equal but it can also be varied over the diameter of the diaphragm and may be substantially larger, for instance, in the center where the deformation is greater, than in the vicinity of the edge zones.

Uniform increase toward the center is possible, but also an increase of the spacing which approaches a maximum value asymptotically at approximately ¼ of the distance from the center of the diaphragm.

The nozzle can be cut out of the plates or rings surrounding the diaphragm, the discharge openings of which end tangentially on both sides in the respective chambers.

It is also possible to construct the two mirror-symmetrical stop plates separate from the housing, making them unmovable in a direction parallel to the direction of the introduced vibrations, seal them liquid-tight against the housing but allow them to rotate relative to each other. Here, also a recess for receiving the diaphragm is provided in the center region in addition to a multiplicity of slots for forming the stop grid. The stop grid is surrounded by the spirally arranged channel which, starting at the surface of the end face of the stop plate, assumes in its course increasing depth, finally goes through the stop plate and is continued on the other stop plate in the same sense with decreasing depth until it opens through an outlet on the other side of the plate. Through the mirror-symmetrical assembly of the two stop plates and mutual rotation, the actual length and, with limitations, the cross section of the nozzle formed by the channels on both sides can be adjusted very exactly, thereby the damping obtained is optimized as to the order of magnitude and can be adjusted for a given frequency range. It has been found that, with appropriate design, a circular flow of the hydraulic liquid in the same direction is developed in the working and equalization chambers when the cone element is sprung in the direction of the discharge outlet of the plate, and its direction changes spontaneously for the opposite oscillating motion. In braking the liquid masses rotating in both chambers and in accelerating them again, part of the vibration energy introduced is irreversibly dissipated, whereby the effect of using a relatively long nozzle between the two chambers is substantially enhanced. Especially good properties can be obtained if several nozzles are used which are distributed at regular spacings over the circumference and the outlet openings of which are oriented in the same direction.

As the hydraulic liquid, the customary hydraulic oils can be used. Special attention is required that the selected liquid has uniform viscosity in the range of temperatures to be expected under operating conditions. From this point of view the use of a mixture of glycol and water has been found to be more advantageous, preferably of glycerin and water, the two substances being preferably mixed in a ratio of 1:1 to 2:1.

Referring to the drawings, the bearing support shown consists of a bearing base 1 with a hole arranged therein with a thread for fastening a vibrating machine part to be supported, for instance, a motor or a wheel bearing. The bearing base is of cylindrical shape and is joined undetachably to the top of cone element 2 of rubber-elastic material which is bonded to housing 3. The surfaces delineating the cone element against the bearing base and against the housing are essentially aligned parallel to each other. The housing is furthermore provided with a flange having several holes to make a screw connection, for instance, to a vehicle body, possible.

The housing has along the inside bottom a circumferential recess which opens inward at an angle and in which the stop plates 4, 5 and the flexible bellows 7 are anchored by a holding ring 10 in a liquid-tight manner. The stop plates have grid-like slots 12 and recesses in the center region which are designed so that on both sides of movable diaphragm 11 an axial separation of the slots and diaphragm is obtained. The diaphragm is clamped in a liquid-tight manner with a circumferential bead between the two stop plates outside the grid. The thickness of the diaphragm is reduced in a radial direction inside the bead to obtain improved mobility. It can also be supported without positive clamping, freely movable in the axial direction in the recess.

The two stop plates are further penetrated by the nozzle 6 which surrounds in spiral-fashion the grid formed by the cutouts 12; the channels on both sides should merge into each other as uniformly as possible. In view of good adjustability of the length of the nozzle by mutual rotation of the two stop plates 4, 5, small pitch angles of the channels have been found suitable, for instance, values of less than 10° and preferably in a range of 1° to 4°. If, on the other hand, several nozzles are distributed over the circumference of the stop plates at regular spacings, it may be necessary for reasons of geometry to choose larger pitch angles, for instance, in the range of 20° to 30°. Regardless, it is desirable in all cases that the ends lead on both sides tangentially into the working chamber 8 on the one hand and into the equalization chamber 9, on the other hand.

The equalization chamber is bounded at the bottom by flexible bellows 7 which are designed as a rolled diaphragm. It consists of the soft rubber layer which is reinforced by fabric of polyester filaments. The rolled diaphragm has an average wall thickness of 0.3 mm. It is especially protected by an additional protective cap 14 of sheet steel because of its mechanical sensitivity. The protective cap has a venting hole 13 in order to ensure free mobility of the rolled diaphragm. It is also possible to make the protective cap rugged and to use it for anchoring the support instead of a flange of the housing.

The hydraulic liquid used is a mixture of water and glycerin in the ratio 1:2. It has uniform viscosity in a temperature range from $-30°$ to $+100°$ C., and foam formation impairing the damping effect does not take place even if high frequencies are introduced. The free passage cross section of the nozzle is 43 $mm^2$ for a volume of the working space of 58 $cm^3$.

Figure 2:
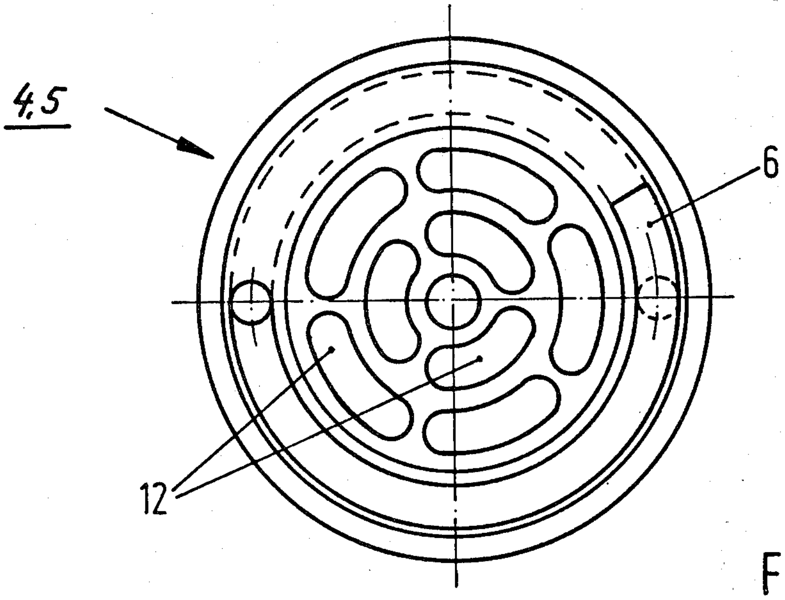
FIG. 2 shows the stop plates (4,5) in a top view.
Figure 3:
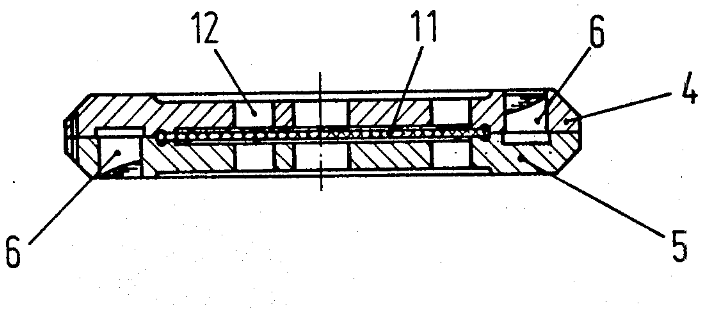
FIG. 3, shows the stop plates (4, 5) and the diaphragm (11) according to FIG. 1 in a longitudinal section.
Figure 4:
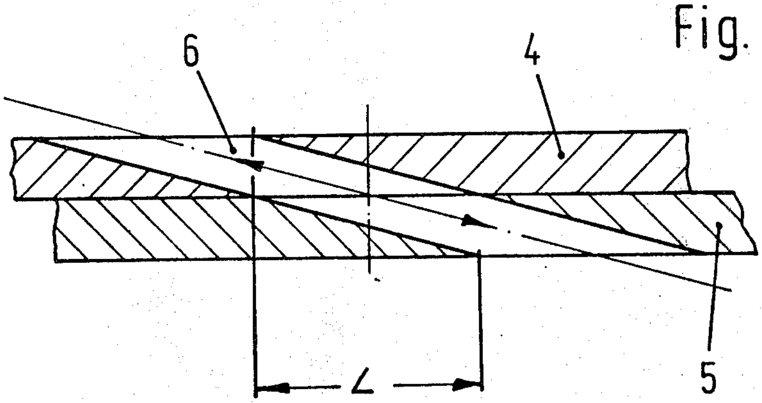
FIG. 4 makes reference to a longitudinal section through the nozzle (6) of stop plates (4, 5) according to FIGS. 2 and 3.

In FIG. 2, the two stop plates 4, 5, which are connected to each other, are shown in a top view. The nozzle 6 formed by the chambers goes in one spiral turn through the single stop plate with a thickness of about 6 mm over a radial length of about 430° with uniform pitch. The continuation of the chamber through the other plate is arranged with mirror-symmetry. A cross section is obtained which remains constant nearly over the entire length. The length can be adjusted by mutual rotation of the two stop plates, which is to be illustrated by FIG. 4. FIG. 4 refers to the arrangement of the nozzle 6 through the two stop plates 4, 5 where a view to scale was dispensed with for reasons of visibility. The length of the nozzle is therefore presented in substantially forshortened form as compared to the thickness of the stop plates. It will be seen, however, that through a relative shift of the stop plate 5 with respect to the stop plate 4, the nozzle 6 is lengthened or shortened, and, to a limited degree also its cross section. This process is practically followed out by mutual rotation in the case of the stop plates according to FIG. 2. The bearing support of the invention can thereby be optimized with respect to the magnitude of the damping effect obtained, the position of the damping and the frequency range. The stop plates may consist of metal or plastic, but a construction as an aluminum pressure casting is preferred because of the high mechanical stiffness.

The calculated diameter of the nozzle is found for the cross section shown, which deviates from a circular profile, as the square root of the product of the factor 1.27 and the cross sectional area of the nozzle. Different cross sectional shapes can be entered correspondingly. They have no effect on the operation.

The length of the nozzle corresponds to the distance in which the profile of the channel is bounded on all sides by fixed walls. The entrance and exit wedges of equal pitch which follow this region on both sides, are not counted and are not taken into consideration.

The length is designated with "L" in FIG. 4.

We claim:

1. A working chamber, expansion chamber hydraulic bearing support which comprises: a conical element of elastic material having a bearing base top and a concave bottom in an annular housing, a diaphragm centered between two stop plates mated to the inside circumference of the housing bottom, a flexible bellows forming the expansion chamber mounted on the bottom of the housing, and a nozzle rigidly associated with the inside circumference of the housing bottom or with the stop plates, the nozzle connecting the working and expansion chambers, the ratio of the length to diameter of the nozzle being in the range of 4:1 to 80:1 and the ratio of the volume of the working chamber to the volume of the nozzle being in the range of from 4:1 to 200:1.

2. A bearing support according to claim 1 wherein the ratio of length to diameter of the nozzle is 10:1 to 30:1 and the ratio of the volume of the working chamber to the volume of the nozzle is 8:1 to 60:1.

3. A bearing support according to claim 1 or 2 wherein the diaphragm is a stiff small plate, the plates are annular rings joining the bottom of the housing, and the diaphragm connected to the rings by a flexible transition piece.

4. A bearing support according to claim 1 wherein the diaphragm is flexible and the stop plates have the form of a grid connected by a support flange to the housing and the recurring slots forming the grid expose a diaphragm surface area of 40 to 90%.

5. A bearing support according to claim 1 wherein the stop plates are separate from the housing, are sealed liquid-tight against the housing, can rotate relative to each other, have central recesses for receiving the diaphragm which are sized to maintain an axial separation of the plates and diaphragm, have slots forming a grid exposing 40 to 90% of the diaphragm surface area and have a circumferential bead for clamping the diaphragm.

6. A bearing support according to claim 1, 2, 4 or 5 wherein the nozzle is formed by a spiral-fashion channel in each stop plate, the discharge openings of which end on both sides of the plates tangentially in the respective chambers.

7. A bearing support according to claim 5 wherein several nozzles are distributed over the circumference of the plates at regular spacings and the discharge openings are oriented in the same direction.

8. A bearing support according to claim 1, 2, 4, 5, wherein the hydraulic liquid is a mixture of glycerin and water, and the mixing ratio of both substances is 1 to 2.

9. A bearing support according to claim 7 wherein the pitch angle of the channel in each plate is less than 10%.

10. A bearing support according to claim 1 wherein the two stop plates are annular rings immovably joined to the housing bottom.

* * * * *